United States Patent [19]
Bianchini

[11] 3,914,662
[45] Oct. 21, 1975

[54] FAIL-SAFE APPARATUS FOR CHECKING THE PRESENCE OF FLAME IN A BURNER

[75] Inventor: Gianni Bianchini, Reggio Emilia, Italy

[73] Assignee: Societa Italiana Elettronica S.p.A., Milan, Italy

[22] Filed: Apr. 18, 1974

[21] Appl. No.: 462,190

[52] U.S. Cl. ................................ 317/124; 340/228.2
[51] Int. Cl.² ............................................ H01H 47/24
[58] Field of Search ........ 317/124, 147; 431/24, 69, 431/79; 340/227 R, 228.2; 250/372; 307/233; 328/6

[56] References Cited
UNITED STATES PATENTS

| | | | |
|---|---|---|---|
| 2,807,008 | 9/1957 | Rowell | 340/228.2 |
| 2,834,008 | 5/1958 | Carbauh | 340/228.2 |
| 3,501,652 | 3/1970 | Thomson | 431/79 |

Primary Examiner—J. D. Miller
Assistant Examiner—Harry E. Moose, Jr.
Attorney, Agent, or Firm—Ostrolenk, Faber, Gerb & Soffen

[57] ABSTRACT

A control device for monitoring the presence or absence of a flame through the use of an ionization tube sensitive to radiation of a predetermined wavelength and which is emitted by the flame. Energy storage means are employed to accumulate the signals generated by the ionization tube. The stored energy is periodically pulsed to discharge the stored energy in an intermittent manner thereby delaying the generation of a signal representing the absence of a flame. The state of the energy storage means is digitized at the aforesaid periodic rate and is restored generally to its undigitized form before controlling the delayed generation of a flame-out signal.

13 Claims, 3 Drawing Figures

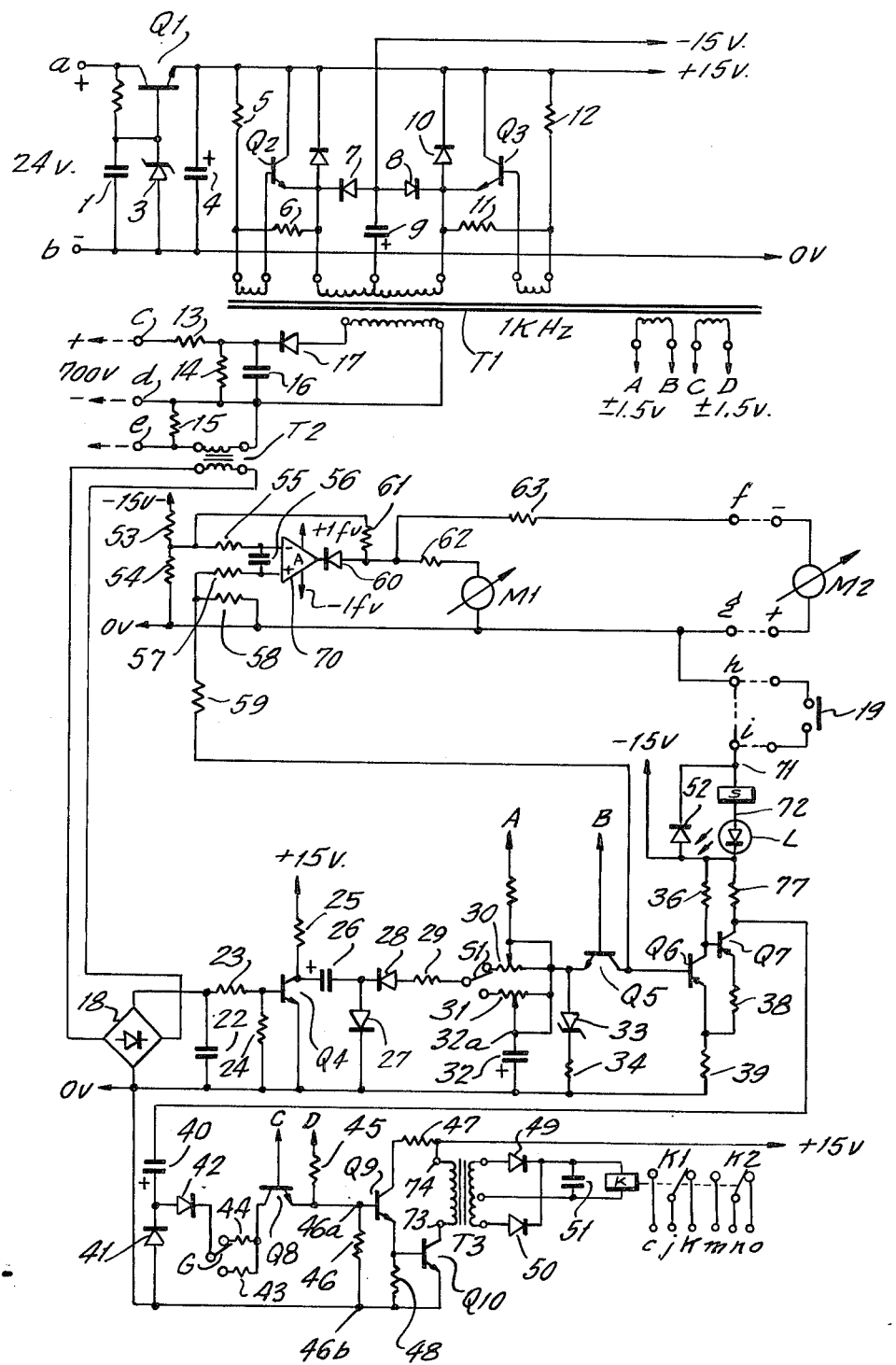

FAIL-SAFE APPARATUS FOR CHECKING THE PRESENCE OF FLAME IN A BURNER

The present invention relates to devices for controlling the continuity of flame, for the automatic protection and the safety of a heating system based on the detection of characteristic radiations emitted by the flame by means of ionization tubes, in which by effect of the incidence of radiation in a particular wavelength range (generally ultra-violet radiations) a series of avalanche discharges is initiated, giving rise to a train of pulse signals.

Generally the detection systems described consist of a detecting head, with the tube exposed to the radiation of the flame, a line for the power supply and the transmission of the pulse signals, and an apparatus, commonly called a control station, which supplies power to the tube, receives the pulse signals, measures the mean frequency of the pulses with a circuit having special characteristics, and energizes a relay which indicates the presence of flame, called a flame relay, when the value measured exceeds a pre-established threshold, and de-energizes the flame relay a predetermined short time after the disappearance of the flame.

For the purposes of safety of the heating plant it is extremely important not only to be able to have a highly dependable detector, such as to give signals only for the actual presence of a flame, but independently thereof the control station apparatus which provides for the measurement of the signals and the flame indication must also be effectively dependable and must on no account give false indications of the presence of a flame.

While the ionization tube, if used correctly during its period of useful life, has an extremely high degree of dependability, it is extremely disadvantageous to use a control station which utilizes complex electronic circuitry in which every component, with its own probability of failure, multiplies the probability of misprotection of the entire apparatus against a failure.

These disadvantages existing in apparatus presently in use can be avoided only by means of a complex system based on a mechanical shutter, which intermittently prevents the radiation from striking the sensitive tube. This mechanism in all cases limits the maximum sensitivity of the detection system, and in many cases, because of the particular high-temperature ambient in which it is situated, is destined to break down in a short time.

In addition thereto, the de-energization of the flame relay can occur reliably only after a period of time substantially greater than the obturation time of a tube.

BRIEF DESCRIPTION OF THE INVENTION AND OBJECTS

The present invention pursues the purpose of realizing a new and improved control station with a highly dependable electronic circuit, which avoids the above mentioned disadvantages, as its safety is already continuously controlled and does not depend on the manner of using the sensitive tube. The apparatus of the present invention can be connected to an ionization detector exposed to the radiation and operating either intermittently or continuously. In either case the flame relay is energized only when a series of pulse signals due to ionization is reliably present at the input, while the absence of pulses at the input and other dangerous conditions, especially those deriving from a possible failure of any electronic component, cause in a pre-established maximum time the de-energization of the flame relay. Throughout the present description that prerogative is defined as "fail-safe reliability."

It is, therefore, one object of the present invention to provide a circuit for measuring pulse signals coming from a transducer, such as an ionization tube sensitive to the radiations of a flame, supplying, for example by energization of a relay, an indication of presence of signal and hence of flame, in a fail-safe manner.

Another object of the present invention is to provide a device for continuously controlling in a reliable and fail-safe manner the perfect operation of all detection circuits present in a flame control station, for example with ultraviolet radiations, without the necessity of having to resort to the periodical obturation of the sensitive tube which furnishes pulse signals by effect of the radiation of the flame.

Another object of the present invention is to provide a new and improved circuit, particularly useful in a device for the control of ultraviolet radiation detected by ionization tubes and the like, which permits an extremely high maximum sensitivity, a wide possibility of calibration of threshold levels, a constancy of response time after the disappearance of the input pulse signals with fail-safe reliability, but without requiring that the operation of the tube and hence the series of discharges due to ionization must be somehow periodically interrupted.

Another object of the present invention is to provide, with a new electronic circuit, a flame presence signal with fail-safe reliability and thus to make it possible to carry out, with any frequency and in an entirely independent manner, the periodic verification of the aging of the tube, giving an independent signal as soon as replacement of the tube becomes necessary.

In a flame control device, with possibility of calibrating the sensitivity and the response times, which receives input pulses derived from one or more detecting heads exposed to the radiation of the flame and comprising preferably ionization tubes, and which supplies at its output a fail-safe flame signal, the above stated purposes are achieved, according to the invention, in that the device is formed by a main chain of individually fail-safe stages, the first stage receiving at the input the pulse signal not necessarily modulated by a mechanical shutter, and the chain of main stages is constructed so that the presence of the useful signal at the input of each single stage is indispensable to form the useful signal at the output of the main chain, and each stage of the main chain is a stage of dynamic cyclic operation, in which, under the action of a periodically variable electric test signal, which is not necessarily the same for all stages, each component of the stage can run through, periodically and continuously, all points of its operating characteristic, and lastly each stage is constructed so that the useful signal at the output of the stage does not occur when at least one component indispensable for fail-safe reliability does not continuously run through, for at least a full cycle period, all points of its operating characteristic.

BRIEF DESCRIPTION OF THE FIGURES

The invention and the above, as well as other, objects will be best understood from a consideration of the following description and drawings, in which:

FIG. 3 indicates more in detail and in schematic form, a preferential execution of the entire control station, according to the invention.

DETAILED DESCRIPTION OF THE INVENTION

Figure 1:
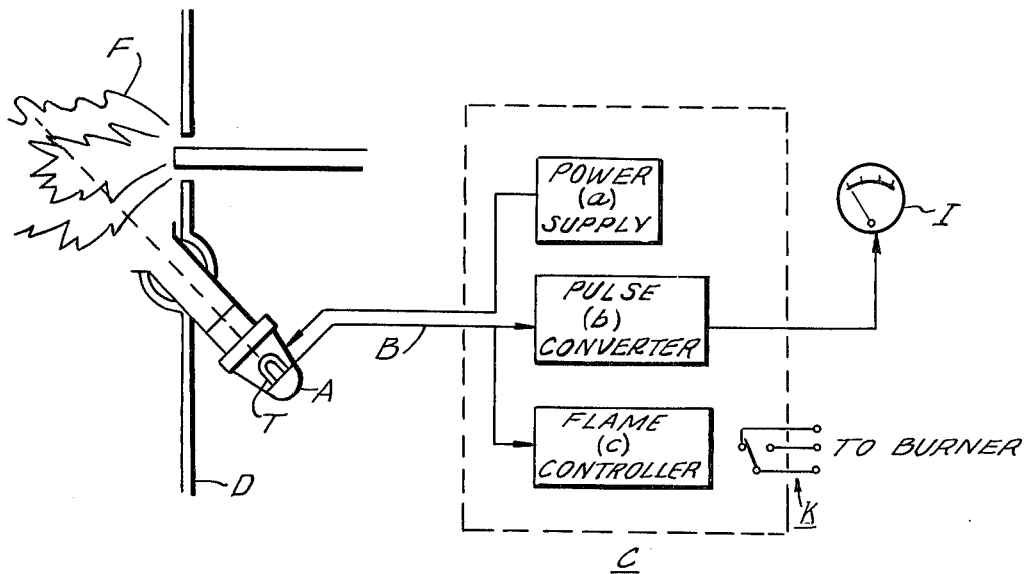
FIG. 1 indicates the essential structure of the fail-safe flame detecting system according to the invention.

According to the principles of the invention, the flame detecting system as a whole is composed essentially as described in FIG. 1, namely:

A detector head A, to be placed near the combustion chamber D in close optical relation with the flame F to be monitored and controlled, and equipped with an ionization tube T sensitive to ultraviolet radiation, polarization circuits, discharge control, and transmission of the pulse signals;

A line B connected to the detecting head, by means of two or more wires, to supply power to the head and to transmit the signals over a distance;

An electronic control station C placed at a proper distance, connected to line B, and having apparatus which performs the following functions:

a. an electric power supply to supply power to the head at proper voltage and power levels;

b. means for receiving and converting the received pulse signals to develop a quantitative indication thereof, on local or remote display instruments I;

c. means for receiving the pulse signals and, on the basis of their intensity and sensitivity levels predetermined by calibration, causing the flame relay to be energized or de-energized, for the purpose of actuating the safety devices of the burner in case of absence of flame.

This latter function (c) is by far the most critical for the purposes of the safety of the entire system, and, therefore, a special objective of the present invention, which consists of a new and improved type of control station, which combines with excellent performance the advantage of being fully fail-safe.

This characteristic is completely independent of whether or not there are devices and/or circuits employed for the periodic checking of the tube operating characteristics, which, therefore, can be done at times and in ways most suitable for the particular case.

The invention is based on the following consideration:

For a complex electronic apparatus consisting of a series of stages to be fail-safe, it is sufficient that the following two conditions are met simultaneously:

a. each individual state must be fail-safe, in the above sense;

b. the series must be conceived so that non-occurrence of the characteristic signal in any one stage prevents the output of the characteristic signals in all subsequent stages.

Figure 2:
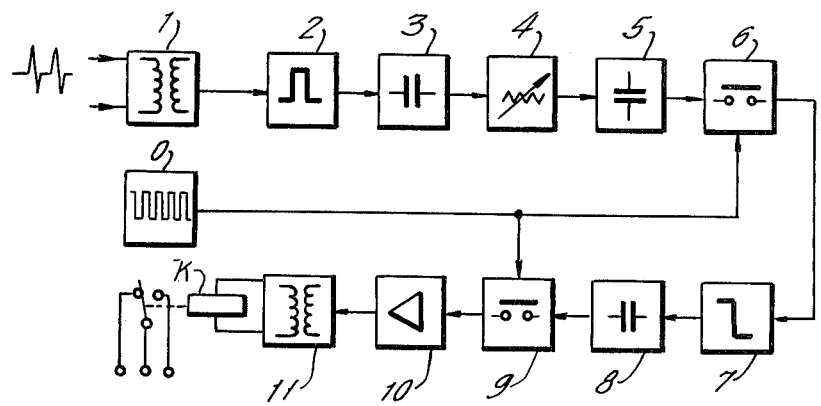
FIG. 2 indicates a preferential block diagram of the essential part of the control station in an example of realization, according to the invention.

To obtain the degree of safety required in flame detector stations, an apparatus has been developed which meets these requirements and which in its preferred realization operates according to the block diagram of FIG. 2.

Independently of the methods of transmission of the pulse signals to the control station, each stage, represented by a "black box," is made to operate dynamically, so that each component continuously and periodically runs through all points of its operating characteristic.

For this purpose, where necessary, periodic test signals of a sufficiently high frequency (for example, 1 KHz) are introduced, and the output relay can be energized only if the entire apparatus correctly responds to the test signals.

In the diagram of FIG. 2, the oscillator stage O furnishes the test signals, which may be rectangular wave signals of a given frequency (for example 1 KHz) or other signals of properly defined characteristics.

To prescind from the symbols used in the diagram, the nature of function of each stage is as follows:

Stage 1 (preferably a transformer) receives the signals from the line and transfers only the pulse signals, while adapting the impedance of the line to the input impedance of the control station.

Stage 2 (preferably a rectifier and pulse shaper) gives to the signals a specific form and level.

Stage 3 (preferably a capacitor) utilizes the alternation of levels to transfer energy to the following stages.

Stage 4 (preferably an adjustable potentiometer) calibrates the sensitivity of the system, suitably proportioning the transfer of energy.

Stage 5 (preferably a capacitor) stores the energy received from the signals, giving at the output a voltage level corresponding to the integral mean.

Stage 6 (preferably a controlled switch), by a special test signal, samples the voltage at the input.

Stage 7 (preferably a trigger circuit), generates a digital output signal whenever in a sampled signal it exceeds a certain threshold level chosen on the basis of the required maximum sensitivity.

Stage 8 (preferably a capacitor) utilizes this alternation of levels to restore the level of energy stored by it and from which it furnishes a continuous signal.

Stage 9 (preferably a controlled switch), by means of the test signal, samples the input signal.

Stage 10 amplifies the available signal power.

Stage 11 (preferably a transformer) lastly transfers to the final flame relay K the signals resulting from the chain in normal operation, constituting a barrier for those signals which may derive from breakdown or non-function of the preceding stages.

Other purposes, characteristics and advantages of the invention will become evident from the following description, with reference to the diagram shown in FIG. 3, which shows a preferred realization of a complete control station for flame detection constructed according to the invention.

To the terminals a and b is applied the feed voltage of the apparatus, of 24 V d.c.

The voltage is stabilized by the transistor Q1 to a value of +15 V. The transformer T1, with the transistors Q2 and Q3, operates as an inverter self-oscillating at a frequency of about 1 KHz, which furnishes the negative voltage of −15 V, the periodical test signals of rectangular wave fluctuating between +1.5V and −1.5 V at 1 KHz and also furnishes via the diode 17, the capacitor 16 and the protection resistor 13, to the terminals c and d, a continuous voltage of 700 V, which is coupled to the detector head over a line to provide the ionization tube the necessary voltage of the proper polarity.

Using the wire coupled to terminal d as a common wire, the pulse signals generated by the discharge of the tube due to the ultraviolet rays reach the control station over a third wire ending at the terminal e.

The pulse transformer T2 which corresponds to stage 1 in FIG. 2 transfers the signals separating the continuous voltage levels, and brings about the best impedance adaptation for all alternate components which constitute the signal. The diode Bridge 18, the capacitor 22 and the amplifier formed by Q4 constitute the stage which full wave rectifies and shapes the input to give to the pulses a specific form (stage 2 in FIG. 2), as on the collector of Q4 the voltage switches from 15 to 0 V and then goes up again.

The capacitor 26 with the diodes 27 and 28 (stage 3 in FIG. 2) carries out a fail-safe coupling and stores energy while Q4 is turned off (charging through 27), and then transferring a negative voltage to the next stage when Q4 becomes saturated. The adjustable potentiometers 30-31 (stage 4 in FIG. 2), properly limiting the current flow, permit calibrating the sensitivity from the outside of the control station to obtain the best discrimination between near-by flames.

The sensitivity of the control station may be changed by closing an external contact 19 across the terminals h and i. This causes the switching of contact S1 by coupling terminal 71 to 0 V (terminal 72 being coupled to −15 V). A visually observable light signal is generated by means of the luminescent (i.e. light emitting) diode L.

The capacitor 32, in the presence of flame signals (stage 5 in FIG. 2) establishes a voltage at terminal 32a which is negative relative to ground bus 0V, the mean value of which, as the frequency of the pulses at the input increases, has an approximately logarithmic response owing to the Zener diode 33 and the resistor 34.

An ideal response curve is thereby obtained in that it permits maintaining the discrimination properties of the apparatus at an optimum level within an extremely wide range of radiation intensities, as they occur in practical cases, avoiding the phenomena of uncertainty of measurement or saturation. The voltage present on the capacitor 32 is applied to the following stages intermittently, by effect of the transistor Q5 (stage 6 in FIG. 2) piloted (i.e. alternately operated between conduction and non-conduction) by the test signal coupled thereto by transformer T1.

The next stage is a Schmitt type threshold discriminator (stage 7 in FIG. 2), comprising transistors Q6 and Q7, which, in turn, detects the presence of the flame with fail-safe reliability as it must continuously switch by effect of the flame signal.

In the preferred realization, the threshold of the Schmitt discriminator is put at 2 V. That value is not determining for the purposes of safety, but only to specify the sensitivity of the trigger circuit.

Capacitor 40, in the same manner as capacitor 26, serves to make a fail-safe connection. In particular the energy accumulated by capacitor 40 in the switching cycles is sufficient to maintain in operation the downstream circuits and hence to keep energized the flame relay K for a pre-established time, after the non-occurrence (i.e. termination) of the flame signals.

Resistors 43 and 44 serve to adjustably determine the de-energization delay time of relay K, to a greater or smaller elapsed interval according to the ohmic values of the resistors and the position of switch G. (The capacitor 40 in combination with the diodes 41 and 42 with either resistor 43 or 44 corresponds to stage 8 in FIG. 2).

Normally the de-energization time is 1 second. The transistor Q8 (stage 9 in FIG. 2) acts in a manner analogous to transistor Q5, to make the transfer of the energy accumulated in capacitor 40 to the following stages intermittent in nature.

The transistors Q9 and Q10 and the resistors 46, 47, 48 are the components of the power amplifier stage (stage 10 in FIG. 2) which, like the others, must operate dynamically. The two input terminals of this stage are formed by the terminals 46a and 46b of resistor 46, while the two output terminals are represented by the collector 73 of Q10 and by the +15V line coupled to terminal 74. For this stage, the cyclic dynamic operation is achieved, for example, as follows:

In this stage, the test signal coincides with the useful input signal. This signal is periodically variable, as the preceding stage (stage 9 in FIG. 2) furnishes a periodically sampled useful signal. In every period of its cyclic dynamic operation, the stage (10 in FIG. 2) can assume two extreme operating points, corresponding to the simultaneous non-conduction or saturation of the two transistors Q9, Q10. With the cyclic dynamic operation of the stage, which occurs between said two extreme points, also each component of the stage (Q9, Q10, 46, 47, 48) periodically and continuously runs through all points of its operating characteristic.

Lastly the transformer T3 with the diodes 49 and 50 (stage 11 in FIG. 2) provides for the energization of relay K, in an absolutely fail-safe manner.

A separate circuit, formed essentially by the operational amplifier 70, serves to provide a quantitative indication of the flame intensity on a measuring instrument M1 included in the apparatus, and, if further desired, on a remote instrument M2, assuming as zero the minimum value which is sufficient to energize the flame relay, regardless of the calibration sensitivity of the apparatus.

The input signal at the amplifier 70 is obtained from the collector of Q5 by means of the resistors 57, 58 and 59 and is filtered by the capacitor 56. It follows that no energization of relay K can result from any failure of the amplifier A.

While a preferred form of realization of the invention has been illustrated and described, various modifications thereof will be evident to the specialists, and it is therefore understood that the invention is not limited to the form of realization set forth or to the details thereof, and that it includes the departures therefrom in the spirit and scope of the invention derivable from the description, drawings and claims.

What is claimed is:

1. A flame control device usable with a detector head exposed to the radiation of a flame to be monitored, said detector head preferably comprising an ionization tube which develops an output signal in the presence of flame, said flame control device comprising:
   a chain of stages being connected in cascade fashion, each stage including at least one electrical component;
   a first stage of said chain being coupled to said detector head;
   a first one of all remaining stages including dynamic coupling means to stop the continuous components and to translate only energy given by the alternate components of the input signal;

a second one of said remaining stages including energy storage means for storing energy furnished by said coupling means and generating an electrical signal representative of the signal developed by said detector head;
a third one of said remaining stages including first chopper means for sampling said electrical signal;
a fourth one of said remaining stages including a threshold circuit measuring the level of the sampled signal, for developing an output signal having a first level in the presence of a flame and for developing an output signal of a second level within a predetermined period after the absence of flame.

2. The apparatus of claim 1 wherein said remaining stages further comprise a fifth stage comprising energy storage means coupled to said threshold circuit for converting the output state of the intermittently operated threshold circuit to a continuous signal;
a sixth stage comprising a final output stage; and
a seventh stage comprising second chopper means for intermittently coupling the output of said fifth stage to said final output stage in a periodic manner.

3. The apparatus of claim 2 further comprising relay means coupled to the final output stage.

4. The apparatus of claim 2 wherein the final output stage comprises transformer means coupling the intermittent signal to said relay means.

5. The apparatus of claim 1 wherein said first chopper means is periodically operated by signal generator means whose operating frequency controls the sampling rate of said first chopper means.

6. The apparatus of claim 2 wherein said second chopper means is periodically operated by signal generator means whose operating frequency controls the sampling rate of said second chopper means.

7. A flame monitoring device, which receives at its input a pulse signal originating from at least one detector head exposed to the radiation of a flame, said detector head comprising at least one ionization tube activated by the presence of the flame, said flame monitoring device furnishing at its output a fail-safe flame signal, said flame monitoring device comprising:
a chain of stages connected in cascade fashion, each stage including at least one electrical component and generating a proper output signal by the dynamic operation thereof in the event an input of that stage receives a proper signal from an output of a previous stage;
a first stage of said chain being coupled to said detector head for receiving and shaping a pulse signal from said tube;
a second stage of said chain including dynamic coupling means for translating only energy contained in a pulse signal output from said first stage and for preventing coupling of the continuous component of said first stage output;
a third stage of said chain including energy storage and dissipation means for storing the energy furnished by said second stage and generating an electric signal representative of the signal developed by said detector head;
a fourth stage of said chain including first chopper means for sampling said electrical signal from said third stage;
a fifth stage of said chain including threshold circuit means measuring the level of the sampled signal for developing an output signal having a square-wave shape in the presence of said flame and for developing an output signal having a continuous level after the absence of said flame;
a sixth stage of said chain comprising second energy storage means utilizing a first level of said square-wave signals from said fifth stage for restoring its own level of energy and utilizing a second level of said square-wave signal for making said energy available for a next following stage;
a seventh stage of said chain comprising second chopper means for intermittently transferring the energy stored in said second energy storage means into an eighth stage, the energy stored being completely exhausted within a predetermined period after the absence of said flame; and
an eighth stage of said chain utilizing the energy intermittently made available by said sixth stage for developing an output signal having a square-wave shape in the presence of said flame and for developing an output signal having a continuous level within a predetermined time period after the absence of said flame.

8. The device of claim 7, wherein said third stage includes adjustable resistor means for calibrating the sensitivity of the device.

9. The device of claim 7, wherein said third stage includes switching means for selecting the sensitivity of the device.

10. The device of claim 7, wherein said sixth stage includes current limiting means for adjusting a delay time for response to the absence of said flame by changing the rate of energy discharge.

11. The device of claim 10, wherein said sixth stage includes said switching means for selecting said delay time responsive to the absence of said flame, by changing the energy discharge rate.

12. The device of claim 7, wherein the last stage of the chain comprises relay means whose contacts form the output signal of the device and transformer means coupled to the output of the previous stage for transferring energy to said relay means responsive to an alternation of output signal levels therefrom.

13. The device of claim 7, wherein a square-wave signal generator controls said first and second chopper means.

* * * * *